United States Patent
Miranda et al.

(10) Patent No.: US 9,458,834 B2
(45) Date of Patent: Oct. 4, 2016

(54) METHOD FOR DE-ICING THE BLADES OF A WIND TURBINE AND A WIND TURBINE WITH A DE-ICING SYSTEM

(75) Inventors: Erik Carl Lehnskov Miranda, Randers SV (DK); Martin Møller Sørensen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 960 days.

(21) Appl. No.: 13/636,643

(22) PCT Filed: Mar. 22, 2011

(86) PCT No.: PCT/EP2011/054360
§ 371 (c)(1),
(2), (4) Date: Dec. 10, 2012

(87) PCT Pub. No.: WO2011/117246
PCT Pub. Date: Sep. 29, 2011

(65) Prior Publication Data
US 2013/0078093 A1    Mar. 28, 2013

Related U.S. Application Data

(60) Provisional application No. 61/316,541, filed on Mar. 23, 2010.

(51) Int. Cl.
*F03D 80/40* (2016.01)
*F03D 11/00* (2006.01)
*F03D 7/02* (2006.01)

(52) U.S. Cl.
CPC ......... *F03D 11/0025* (2013.01); *F03D 7/0224* (2013.01); *F03D 80/40* (2016.05); *F05B 2270/32* (2013.01); *F05B 2270/334* (2013.01); *Y02E 10/722* (2013.01); *Y02E 10/723* (2013.01)

(58) Field of Classification Search
CPC .. F03D 11/0025; F03D 7/0224; F03D 7/022; F03D 80/40; F05B 2270/334; F05B 2270/32
See application file for complete search history.

(56) References Cited

U.S. PATENT DOCUMENTS

| | | | |
|---|---|---|---|
| 4,342,539 A * | 8/1982 | Potter | F03D 7/06 416/132 B |
| 6,890,152 B1 | 5/2005 | Thisted | |
| 2006/0018752 A1 | 1/2006 | LeMieux | |
| 2009/0246019 A1 | 10/2009 | Volanthen et al. | |
| 2010/0074748 A1* | 3/2010 | Godsk | F03D 7/0224 416/1 |
| 2010/0135787 A1* | 6/2010 | Scholte-Wassink | F03D 7/0212 416/1 |

FOREIGN PATENT DOCUMENTS

WO    2009043352 A3    11/2009

OTHER PUBLICATIONS

International Search Report dated Jan. 12, 2012, for International Application No. PCT/EP2011/054360, 3 pages.

(Continued)

*Primary Examiner* — Eric Keasel
*Assistant Examiner* — Danielle M Christensen
(74) *Attorney, Agent, or Firm* — Patterson + Sheridan LLP (57) ABSTRACT

The invention refers to a method for de-icing a blade of a wind turbine. The de-icing is carried out by means of stalling the wind turbine and at least to a position where enough turbulence is created to induce vibrations in the blade allowing ice to break off.

14 Claims, 5 Drawing Sheets

(56) References Cited

OTHER PUBLICATIONS

Seifert et al., "Technical Requirements for Rotor Blades Operating in Cold Climate", paper presented at BOREAS 6, Pyhä, Finland, Apr. 2003, pp. 1-13. Retrieved from: <<http://www.dewi.de/dewi/fileadmin/pdf/publications/Magazin_26/boreas_vi_seifert_01.pdf>>.

* cited by examiner

METHOD FOR DE-ICING THE BLADES OF A WIND TURBINE AND A WIND TURBINE WITH A DE-ICING SYSTEM

TECHNICAL FIELD

The present invention relates to a method for de-icing the blades of a wind turbine and to a wind turbine with a de-icing system.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front.

As large modern wind turbines get bigger and bigger both in power output and in cost the issue of downtime becomes more and more significant and modern wind turbines are constantly improved to ensure that they are able to produce power efficiently whenever usable wind conditions are present.

However, icing of the wind turbine blades can be a big problem in that it can prevent the wind turbine from producing power even though ideal wind conditions are present. From U.S. Pat. No. 6,890,152 it is known to provide the blades of a wind turbine with a number of sonic horns, which will make the blades vibrating when being activated and thereby make the ice break off. The disadvantages of such a system are unfortunately many, noise problems, cost, difficult to implement in the blades etc.

Further known solutions comprise passive coating of the blades and active heating panels. Currently no coating is available that lasts more than a couple of years and the heating panels require apart from the panels wiring and this reduces the aerodynamic efficiency of the blade as well as it causes problems as regards lightning.

SUMMARY OF THE INVENTION

According to one aspect of the present invention a method for de-icing a blade of a wind turbine is provided wherein the de-icing is carried out by means of stalling the wind turbine to thereby allow the correspondingly caused turbulences on a (rotor) blade of the wind turbine to induce vibrations in the blade allowing ice to break off. Controlled stalling can be provided by a controlled change of the flow condition around the blade. Such a change of the flow condition around the blade may be achieved by changing the mechanical arrangement of the blade or the mechanical structure of the blade, which, for example, comprises changing the pitch angle of the blade (mechanical arrangement change) to thereby change the angle of attack (will be described further below) and/or which comprises changing the cross-sectional (flow) profile of the blade (mechanical structure change). The change in flow condition around the blade in order to provide for stalling may also be achieved by means of nozzles arranged in the blade and allowing creation of a counter flow on the blade's surface, destroying the laminar flow along the blade's surface.

As mentioned above, a way of stalling the wind turbine is to pitch the blade or the blades towards a stall position. An advantage of this way of stalling may be seen in that it may only require an update of the software. That is, the pitch angle of the blades of wind turbines are usually adjustable anyway in order to be able to adapt the angle of attack of the blades to changing ambient wind conditions and changing rotational speed conditions of the rotor, to which the blades are attached to. Accordingly, a software of a control device, which software usually adjusts the angle of attack in a manner so as to provide for optimal rotation of the rotor of the wind turbine depending on, for example, the above mentioned conditions (ambient wind speed and rotation speed of rotor) and on pre-known aerodynamic characteristics of the blades, can be easily amended to be able to initiate the stall conditions on the basis of, for example, a detected ambient wind speed, a detected rotational speed of the rotor, to which the blades are attached to, and on the basis of pre-known aerodynamic characteristics of the blades of the wind turbine. Another advantage may be seen in that this de-icing can be carried out without any interruption in the power production which often is the case with prior art de-icing methods. There may also be used other ways of stalling the wind turbine/blades. For example, the blades may include a respective device for changing the cross-sectional (flow) profile of the respective rotor blade so as to cause a stall if the de-icing is required.

Since the de-icing method according to the present invention is carried out or can be carried out without stopping the wind turbine it may be desirable to pitch or stall all blades of the wind turbine simultaneously in order to avoid an uneven load on the wind turbine.

Under certain circumstances the amount of ice collected on a specific blade might be different from the amount of ice collected on another blade of the same wind turbine. To be able to take such a condition into account, the present invention may be provided in a manner so as to allow for the possibility to individually control the pitch angle for de-icing for all of the blades. To this end, the respective blade may be provided with an ice sensor device respectively detecting the occurrence of ice on a corresponding blade. And, a control device which, for example controls the pitch angle of the respective adjustable blade, receives a corresponding triggering signal from the ice sensor device, which causes the control device to initiate/trigger the de-icing method or de-icing process according to the invention. That is, the control device then controls that blade, on which the ice was detected, to, for example, decrease the pitch angle thereof (thereby causing an increase of the angle of attack) to cause the stall condition. It is to be noted that in wind turbine technology the pitch angle of the rotor blades and the corresponding angle of attack are usually taken in coordinate systems such that these two angles have opposite signs. Accordingly, a decrease in pitch angle causes an increase of the angle of attack, and the other way round. However, pitch angle and angle of attack may also be taken in such coordinate systems, for example in the same coordinate system, such that they have the same sign so that in order to increase the angle of attack the pitch angle of the corresponding blade would then have to be increased, too. In the following pitch angle of the (respective) blade and angle of attack will be considered to have opposite signs. The control device may alternatively be adapted such that, if it receives a signal from one of the ice sensor devices that the corresponding blade is provided with ice, all the blades of the wind turbine may be subjected to the de-icing method or de-icing program as described herein.

The de-icing according to the present invention may be carried out automatically which of course minimizes maintenance work. For the automation of de-icing it may be desirable to (automatically) know/detect if ice has collected on a blade. One alternative way of finding out is to use an ice detecting sensor or ice detector, as mentioned above, for sending a signal that will initialize or trigger the de-icing "program". For instance, one ice detector available on the market is an optical transducer probe. It has no moving parts, is completely solid and its principle of operation is entirely optical. Intrusive to the airstream and hermetically sealed, it uses un-collimated light to monitor the opacity and optical refractive index of the substance on the probe. Further, it is de-sensitized to ignore a film of water. The device works as a combined optical spectrometer and optical switch. A change in opacity registers as rime ice. A change in refractive index registers as clear ice. Optical components are made of acrylic glass, which is the material normally used for aircraft windshields. The wavelength of the transducer's excitation light is not visible to the human eye so as not to be mistaken for any kind of navigational running light. Other types of ice detectors comprise acoustic sensors, which register changes in the sound wavelength when icing occurs, and nuclear sensor that register changes in emission level when icing occurs between source of radiation and the sensor.

If tuned, ice collected on the blades can be indicated by comparing wind speed and rotational speed of the wind turbine. Under normal operational conditions, i.e. with no ice on the blades, there is a relationship between the above mentioned parameters that results in a specific efficiency (based on aerodynamic characteristics of the blade and the load on the wind turbine, for example, provided by an electric generator driven by the wind turbine). When ice collects on the blades the efficiency decreases. Thus, if properly tuned, the stalling of the wind turbine and hence de-icing could be initialized or triggered when the efficiency goes below a predetermined level. An advantage with this method of detecting ice is that it is not sensitive in the way that it is not relying on the functioning of a separate ice detecting sensor. Further, no extra sensor is required.

As an alternative or in addition to an automatic ice detection, the method for de-icing the blades according to the invention may also be manually triggered. That is, for example, if service staff recognizes ice on the blade(s), the method may be manually triggered/initiated.

The invention further provides a wind turbine using the method as described herein for de-icing the blades thereof.

According to an aspect of the invention a wind turbine is provided, by which the method as described herein may be carried out, comprising: a base; a rotor rotatably connected to the base; a plurality of blades connected to the rotor in a manner so that the pitching angle of the respective blade is adjustable in a controlled manner to correspondingly vary the angle of attack; a de-icing triggering device for creating a de-icing triggering signal; and a control device for controlling the pitching angle of the respective blade, wherein the control device is connected to the de-icing triggering device and is adapted, in case of receiving the de-icing triggering signal, to control the respective blade in a manner so as to change (for example decrease) the pitch angle of the respective blade to increase the corresponding angle of attack until stalling to thereby allow the correspondingly caused turbulences to induce vibrations in the blade causing ice on the blade to break off.

According to a further aspect of the invention, the de-icing triggering device includes an ice detecting sensor or ice detecting sensor device, for example of a type as described above, provided on each of the blades, which can create the de-icing triggering signal. As an alternative or in addition to such an automatically acting de-icing triggering device, which is capable of automatically triggering/initiating the de-icing process, the system may include a manual input device connected to the control device and allowing a user to manually input the triggering signal which will then be supplied to the control device to trigger the de-icing program/method. In this respect, the user may, for example visually, recognize ice on the blade(s) and may then decide to manually initiate the de-icing process.

According to a further aspect of the invention, the de-icing triggering device includes a wind-speed detector detecting the general wind speed in an area at the wind turbine, a rotational speed detector detecting the rotational speed of the rotor, and a calculation device which is adapted to create the de-icing triggering signal as a function of the detected wind-speed and the detected rotational speed of the wind turbine. The calculation device may take into consideration the aerodynamic characteristics of the blades of the wind turbine in its calculation to create the triggering signal. This aspect of de-icing the respective blade on the basis of environment conditions may be combined with the use of an ice sensor device (which directly detects the presence of ice on the blades) in order to increase redundancy. The calculation device may be provided by the control device, for example in form of corresponding software.

According to a further aspect of the invention, the control device is adapted to simultaneously decrease the pitch angle of all of the blades to correspondingly increase the angle of attack of all blades at the same time until stalling in case the de-icing triggering signal is received by the control device. That is, in case the control device receives the de-icing triggering signal from de-icing triggering device, the control device initiates de-icing on all blades.

The control device may include a microprocessor device for processing signals/data received from the sensors and, if provided, from the calculation device of the de-icing triggering device, and may operate actuators for providing the rotational movement of the blades for achieving, for example, the required changes in pitch angle thereof. The actuators may be electrically connected to the control device via wire or wireless connection.

The control device, which is adapted in the manner as described above, together with the actuators for changing the flow conditions around the blades, that is, for example, the actuators for changing the pitch angle of the blades or actuators for changing the shape of the cross-sectional (flow) profile of the blades, and with sensors as described above forms a de-icing system, with which the wind turbine is provided with.

When the control device controls the blades to decrease the pitch angle(s) thereof or to change the cross-section (flow) profile of the blades to allow stalling thereof, such stalling may be controlled by the control device (that is, the control device may be correspondingly adapted to correspondingly control pitch angle change/adjustment of the blades or flow profile change/adjustment) by taking into consideration the rotational speed of the rotor carrying the blades. For example, stalling of all blades may be controlled such that a reduction of rotor rotation speed by at least 30% or at least 50% or at least 75% of the current state is achieved, wherein, however, the rotor is still kept rotating. In case of stalling only one of a plurality of blades or in case of stalling only a number of blades smaller than the overall number of blades, then a reduction of the rotor rotation speed may be calculated as at least $30\%*X/ONP$ or at least $50\%*X/ONP$ or at least $75\%*X/ONP$, wherein X is the number of blades to be stalled and ONP is the overall number of blades of the wind turbine. The stalling may also be controlled by the control device in a manner that a pre-determined pitch angle or a pre-determined cross-section (flow) profile will be provided for the respective blades (for example, for the blade(s) to be stalled or generally for all blades of the wind turbine), which in any case guarantees such turbulences that the blades will be de-iced.

As will be recognized from the above description of the invention, stalling the blades does not mean that the blades have to experience a full-stall completely stalling the flow around the respective blade. Such a full-stall may, however, be provided on the blade or blades if not all of the blades are simultaneously stalled. Otherwise, it is also sufficient to stall the respective blade to a certain extend such as to provide for the required turbulences/vibrations to cause ice break-off.

The method may further include detecting the vibration of or the vibrations provided in the blade or, in case there are a plurality of rotor blades, of or in the respective blade, and if the detected vibration or vibrations exceed a pre-defined threshold, re-changing the flow condition around the blade in a controlled manner so as to correspondingly reduce the stall conditions of the flow around the blade to thereby correspondingly reduce the initiated turbulences to reduce the vibrations in the blade. For re-changing the flow condition to reduce the stall, the same mechanism or mechanisms, which were used to initiate the stall, may be used in another way round. That is, for example, the pitch angle of the blade may be correspondingly re-changed (for example increased) to correspondingly decrease the angle of attack. To (automatically) implement this aspect of the invention, the wind turbine of the invention may include one or more vibration sensors on the (respective) blade, which detect vibrations of or in the blade and which are connected to the control device to supply corresponding feedback vibration signals. The control device may be adapted to compare the vibration signals with a pre-defined vibration threshold, and, if the signals or the signal values exceed the vibration threshold, to re-change the flow condition around the blade in manner as, for example, described above to keep the vibrations in the blade below the pre-defined vibration threshold.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, where the same reference numerals will be used for similar elements.

DETAILED DESCRIPTION OF PREFERRED EMBODIMENTS

Figure 1:
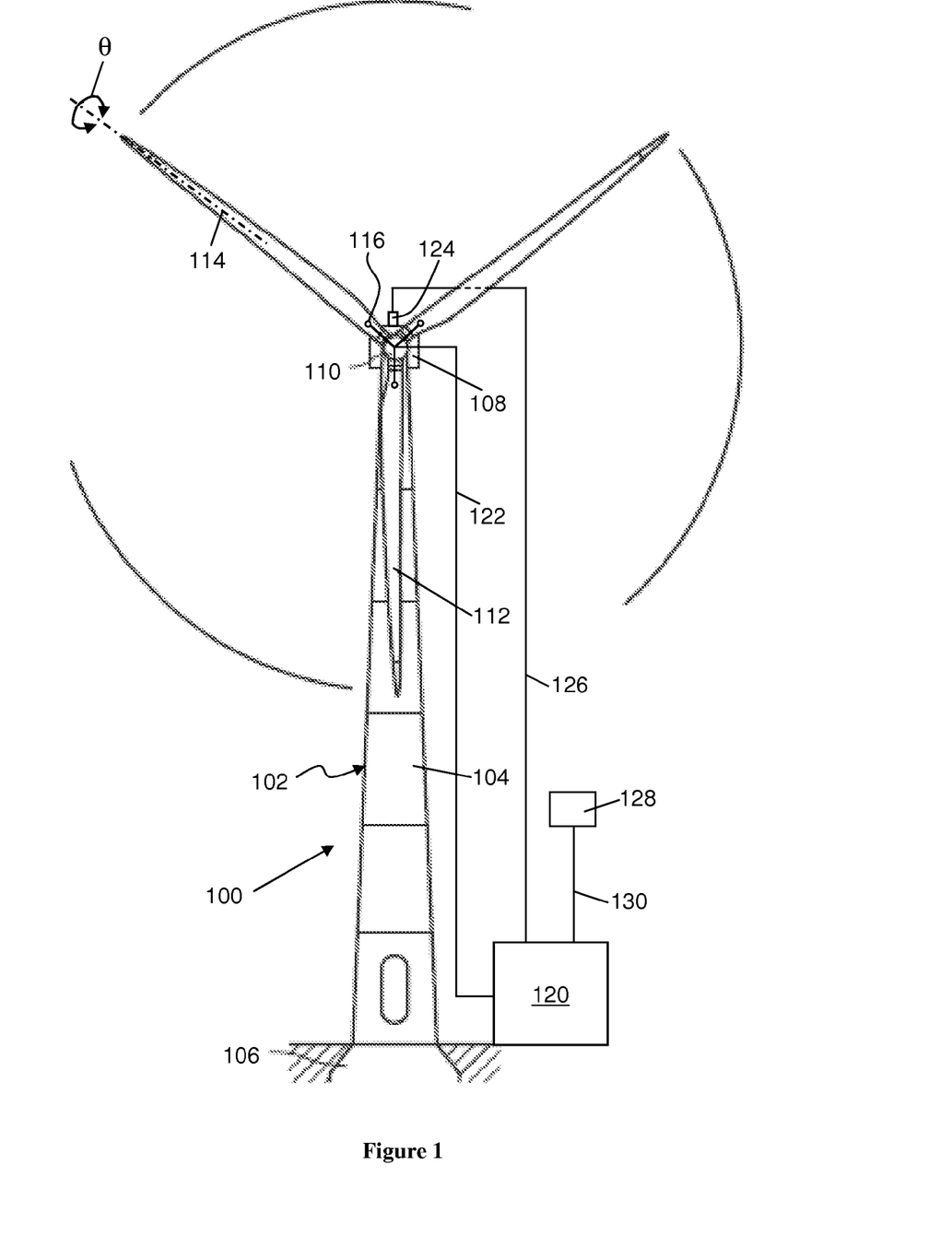
FIG. 1 is a schematic front view of a wind turbine according to an embodiment of the invention.

FIG. 1 illustrates a setup of a wind turbine 100 according to an embodiment of the invention. The wind turbine 100 includes a base 102 in form of a tower 104 mounted on a basement 106. In the present example, the tower 104 comprises a number of tower sections, such as tower rings. Further, the wind turbine 100 comprises a turbine nacelle 108 which is placed on top of the tower 106. A wind turbine rotor 110 is rotatably mounted to the turbine nacelle 108, and at least one rotor blade 112, in the present case, three rotor blades 112 are mounted to the rotor 110. Each rotor blade 112 is rotatably attached to the rotor 110 in a manner so as to be rotatable about a longitudinal axis 114 of the rotor blade 112 to adjust a pitch angle $\theta$ of the rotor blade, that is a pitch angle $\theta$ of the cross-sectional flow profile of the rotor blade 112 about the longitudinal axis 114 of the blade 112 (also cf. FIGS. 3 and 4). (As can be seen from these FIGS. 3 and 4, the pitch angle $\theta$ and an angle of attack $\alpha$ are taken such as to have opposite signs. Accordingly, in order to increase the angle of attack $\alpha$, the corresponding pitch angle $\theta$ of the blade has to be decreased, and the other way round). To correspondingly rotate the respective rotor blade 112 about its longitudinal axis 114 to thereby adjust the corresponding pitch angle $\theta$ of the respective blade 112, each of the rotor blades 112 is provided with an actuator 116, for example an electric step motor or an electro-hydraulic motor, for correspondingly rotating the rotor blades 112. The respective actuator 116 is connected to a control device 120 via an operation connection 122 (for example a wire connection or a wireless connection), which control device 120 controls the operation of the actuators 116 as described further below.

The wind turbine 100 is further provided with a rotation speed sensor 124 for detecting the rotational speed of the rotor 110 and which is connected to the control device 120 via a wire or wireless signal connection 126. Further, the wind turbine 100 is provided with a wind sensor 128 for detecting the ambient wind speed and which is connected to the control device 120 via a wire or wireless connection 130.

The control device 120 is adapted such as to determine an expected rotational speed for the rotor 110 on the basis of the detected wind speed and the pre-known aerodynamic characteristics of the rotor blades 112 and, for example the calculated and/or detected load on the rotor 110, or on the basis of the detected wind speed and a predetermined table including correspondingly expected rotational speeds for the rotor or including correspondingly expected power outputs of an electrical generator (not shown) connected to the rotor 110 to be compared with currently detected power output. In case the expected conditions are not met, the control device 120 may assume that the rotor blades 112 are icy and may then trigger or initiate a de-icing program or de-icing method in a manner so as to operate the actuators 116 to rotate the rotor blades 112 in a direction to change (for example decrease) the pitch angle $\theta$ up to a position, at which the flow about the respective rotor blade 112 stalls. As mentioned above, such a position may be a fixed predetermined angular position or angle $\theta$, at which a stall is expected to occur at any flow conditions. The created stalling may, however, alternatively be kept such that a pre-determined reduction of the rotational speed is achieved, wherein the rotor 110 may then be kept at this reduced rotational speed for a certain time. In this case, the control device 120 receives feedback signals from the rotation speed sensor 124, and if the rotational speed of the rotor 110 changes, for example decreases, too much, the control device 120 correspondingly controls the pitching of the rotor blades 112 to change (for example increases) again.

The result of stalling the blades 112 in a manner as described above will be explained on the basis of FIGS. 3 and 4 as follows.

Figure 3:
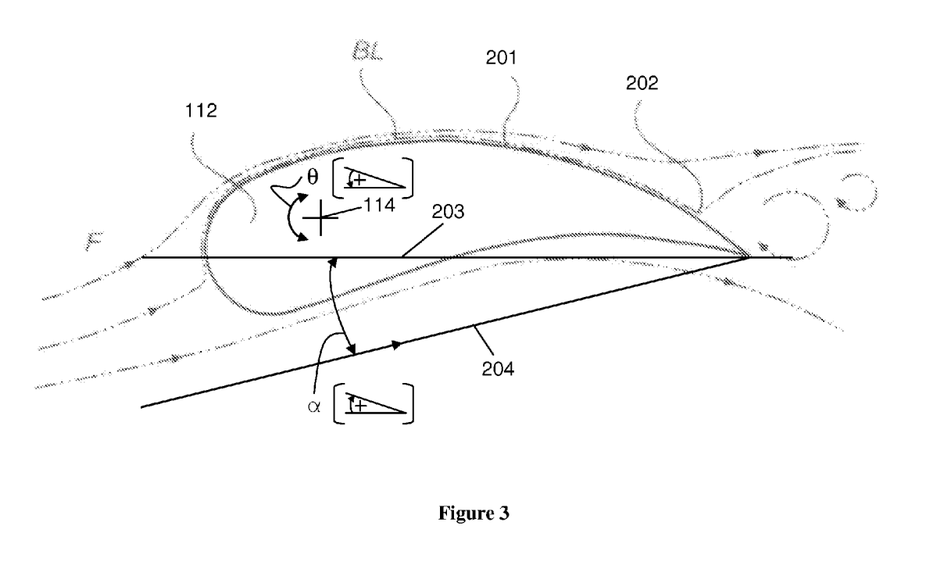
FIG. 3 is a schematic illustration of a first condition of a fluid boundary layer at a wind turbine blade according to normal operating state.
Figure 4:
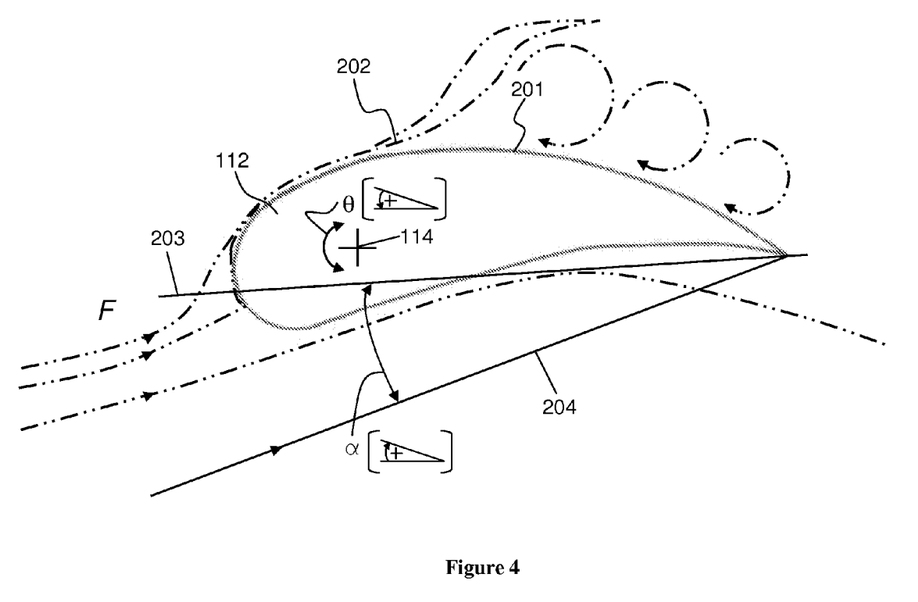
FIG. 4 is a schematic illustration of a second condition of a fluid boundary layer at a wind turbine blade.

FIG. 3 is a schematic illustration of a first condition (normal flow condition) of a fluid boundary layer at a wind turbine blade, and FIG. 4 is a schematic illustration of a second condition of a fluid boundary layer at a wind turbine blade.

FIG. 3 schematically illustrates an air flow F flowing towards a wind turbine blade 112 and over the blade surface 201 forming a boundary layer BL. The boundary layer BL separates from the blade surface 201 at a separation line or transition region 202. Beyond this region 202, turbulence is formed. The shown angle α designates the angle of attack between the chord 203 of the cross sectional flow profile of the blade 112 and the direction of the oncoming flow F, 204. FIG. 3 describes a condition of usual flow about the blade 112, according to which the transition region 202 is located at a downstream end section of the profile of the blade 112, whereby optimal flow conditions are established to provide optimal rotation of the rotor. Starting from the normal flow condition according to FIG. 3, in case of initiating/triggering de-icing or the de-icing program, the control device 120 (cf. FIG. 1) operates the actuators 116 (cf. FIG. 1) to rotate the respective rotor blade 112 around its longitudinal axis 114 in a manner so as to decrease the pitch angle θ, thereby correspondingly increasing the angle of attack α (that is, in FIG. 3 the blade 112 will be rotated clock-wise) to thereby reach a stall condition as described below on the basis of FIG. 4.

FIG. 4 is a schematic illustration of a second condition (stalled flow condition) of a fluid boundary layer at the wind turbine blade 112.

FIG. 4 schematically illustrates an air flow F flowing towards a wind turbine blade 112 and over the blade surface 201. In the situation depicted in FIG. 4 the pitch of the blade 112 is such that there is a stall making the boundary layer separating from the blade surface 201 at a separation line or transition region 202 which is upstream of the transition region 202 of FIG. 1. Beyond this region 202, i.e. downstream of 202, the flow direction is reversed forming a turbulent boundary layer. This turbulent boundary layer makes the blade 112 vibrate and the ice will thus break off. As can be seen from FIG. 4, the angle of attack α is increased compared to the angle of attack α in the flow condition as shown in FIG. 3.

Figure 2:
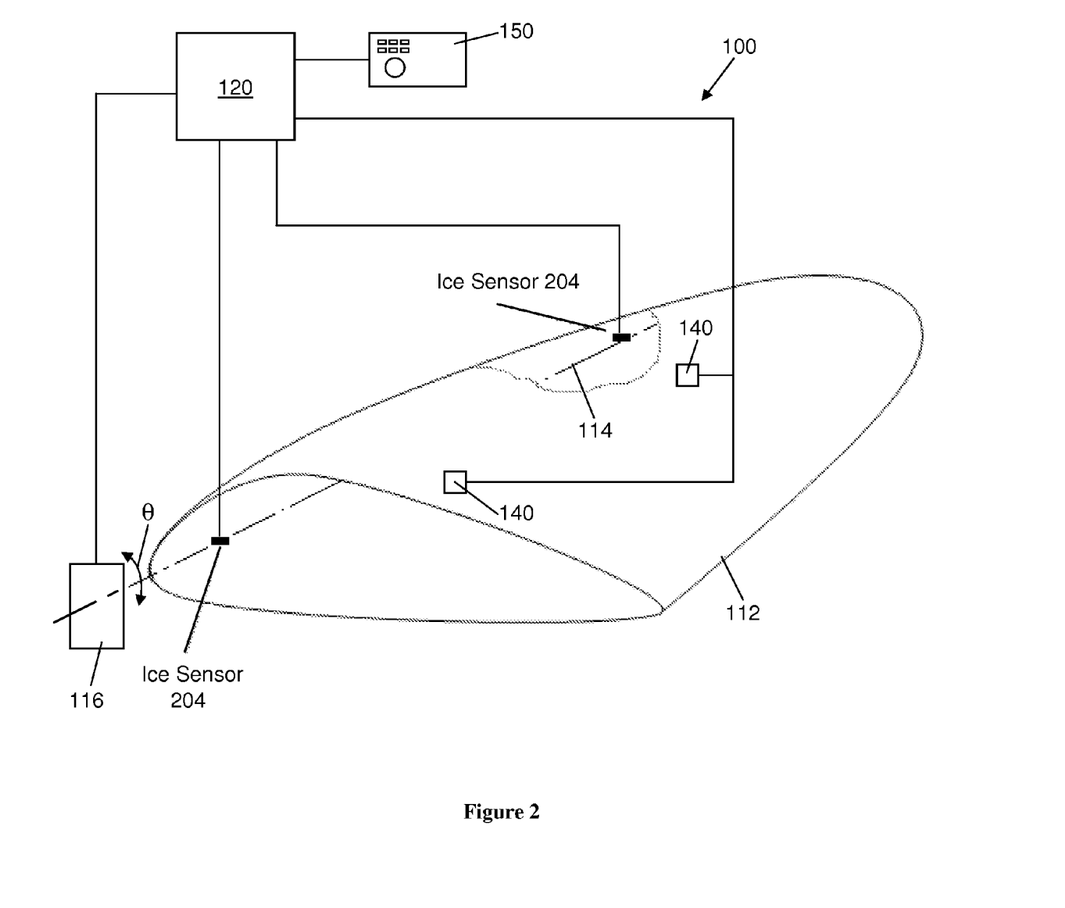
FIG. 2 is a schematic partial view of a wind turbine according to an embodiment of the invention.

FIG. 2 shows a partial view of a wind turbine 100 according to another embodiment of the invention, wherein only one blade 112 of rotor blades of the wind turbine 100 is shown. The technical aspects of the embodiments of FIGS. 1 and 2 are combinable with each other. In the embodiment of FIG. 2, the respective rotor blade 112 of the wind turbine 100 is provided with ice detection sensors 204 forming an ice detection sensor device which can directly detect the presence of ice on the outer surface of the respective rotor blade 112. The ice detection sensors 204 of the ice detection sensor device of the respective rotor blade 112 are connected to a control device 120 of the wind turbine 100, and the ice detection sensor device forms a de-icing triggering device which, in case it detects ice on the rotor blade 120, (automatically) sends a corresponding de-icing triggering signal to the control device 120 which in turn then initiates/triggers a de-icing program for de-icing the respective blade 112, on which the ice was detected, or for de-icing all the blades 112 if at least on one of the blades 112 ice was detected.

Similar to the embodiment of FIG. 1, the control device 120 of the embodiment of FIG. 2 is connected to actuators 116 (only one is shown) assigned to the respective rotor blades 112 and provided to rotate the corresponding rotor blade 112 around a longitudinal axis 114 thereof to thereby be able to decrease the pitch angle θ of the blade and to thereby increase the angle of attack α in order to cause the required stall for creating the required turbulences/vibrations in the blade(s) 112 for carrying out de-icing.

In the wind turbine according to the embodiment of FIG. 2, the respective rotor blade 112 may be further provided with vibration sensors 140 which detect vibrations of the respective blade 112 and which are connected to the control device 120 for transmitting a corresponding vibration signal thereto. The control device 120 may be adapted to control the actuators 116 to increase the pitch angle θ of the respective blade 112 (so as to correspondingly decrease the angle of attack α) in case the received vibration signal exceeds a pre-defined vibration threshold. In this way, the maximum vibration of the respective blade 112 may be reliably kept below the pre-defined vibration threshold.

The wind turbine according the embodiment of FIG. 2 may further include a manual input device 150 connected to the control device and allowing a user to manually input a trigger signal triggering or initiating the de-icing process which will cause the control device to control the actuators 116 to change the pitch angle θ of the blades 112 as described above for causing de-icing. The user may input such a trigger signal when, for example, visually recognizing ice on one of or on the blades. The blades may be visually marked so that a user may also input a corresponding identification code for that blade, on which the user visually detected ice. The control device may be adapted such as to then control only that actuator 116 of the manually identified blade 112 so that only this manually identified blade 112 will be individually de-iced in the above-described manner. As soon as the user (for example visually) recognizes that the ice has been successfully remove, a corresponding stop request to stop the de-icing may be manually input into the input device 150. The control device 120 may also be adapted such to carry out de-icing only for a pre-determined time interval, and if the user (for example visually) recognizes that there is still ice on the plate, the triggering signal may manually input again. There may also be provided alarm devices which are connected to the control device 120, and if, for example, and ice detection sensor device detects ice on the blade, it may forward a corresponding information signal to the control device 120 which then applies the alarm device which for example is a visual and/or audio device. The use may then decide to input the de-icing triggering signal or not.

Figure 5:
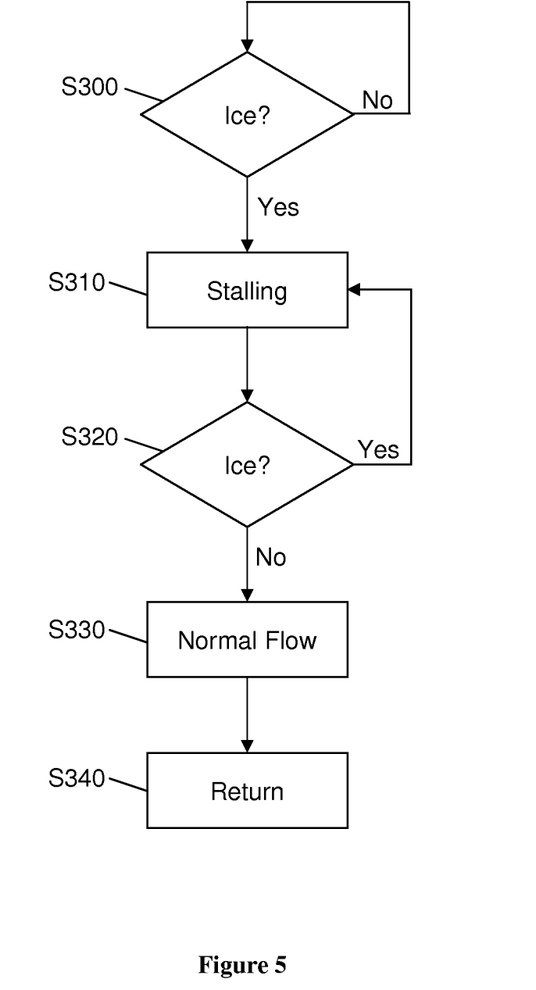
FIG. 5 is a schematic flow chart for explaining a method for de-icing a wind turbine blade according to an embodiment of the invention.

A method for de-icing a (rotor) blade of a wind turbine, such as of a (rotor) blade 112 of a wind turbine 100 as shown in FIGS. 1 and 2, according to an embodiment of the invention will be described on the basis of FIG. 5.

The method includes the following steps determining (S300), for example automatically determining, as to whether ice is present on a rotor blade of the wind turbine. In case it is determined that no ice is present, the method continues with said determination step. If it is determined that ice is present on the blade, carrying out a de-icing program by changing the flow condition around the blade (for example by decreasing the pitch angle of the blade as described above) in such a manner so as to stall the flow around the blade to thereby allow the correspondingly caused turbulences to induce vibrations in the blade causing ice on the blade to break off (S310). The de-icing step S310 is carried out until the ice is removed from the blade. A corresponding determination is carried out in step S320. In case it is determined that the ice has been successfully removed, the method continues with step S330, according to which the change of the flow condition will be reversed to thereby remove the stalled condition and achieve normal flow condition (that is, for example, the pitch angle and correspondingly the angle of attack will be correspondingly reduced). In step S340 the method then returns to the initial step S300.

Although the invention has been described above with reference to specific embodiments, it is readily appreciated by a person skilled in the art that other embodiments than those as disclosed above are equally possible within the scope of the invention, as defined by the appended patent claims.

The invention claimed is:

1. A method for de-icing a blade of a wind turbine, comprising:
   changing a flow condition around the blade in a controlled manner so as to stall a flow around the blade to thereby allow correspondingly caused turbulences to induce vibration in the blade causing ice on the blade to break off; and
   detecting the vibration of the blade, and, if the detected vibration exceeds a pre-defined threshold, re-changing the flow condition around the blade in a controlled manner so as to correspondingly reduce the stall conditions of the flow around the blade to thereby correspondingly reduce the turbulences to reduce the vibrations in the blade.

2. The method according to claim 1, wherein changing the flow condition around the blade comprises changing a mechanical structure or a mechanical arrangement of the blade.

3. The method according to claim 1, wherein the changing of the flow condition around the blade includes changing a pitch angle of the blade to increase the angle of attack until required stalling is achieved.

4. The method according to claim 3, wherein all blades of the wind turbine are de-iced simultaneously by correspondingly changing the pitch angle of all the blades at the same time.

5. The method according to claim 3, wherein the pitch angle for de-icing is controlled individually for all of the blades.

6. The method according to claim 1, wherein the changing of the flow condition for de-icing is initialized by a signal from an ice detecting sensor device.

7. The method according to claim 1, wherein the changing of the flow condition for de-icing is initialized as a function of detected wind-speed and detected rotational speed of the wind turbine.

8. The method according to claim 1, wherein the changing of the flow condition around the blade is controlled as a function of a rotational speed of a rotor carrying the blade.

9. A wind turbine comprising:
   a base;
   a rotor rotatably connected to the base;
   a plurality of blades connected to the rotor in a manner so that a pitch angle of the respective blade is adjustable in a controlled manner to correspondingly vary an angle of attack;
   a de-icing triggering device for creating a de-icing triggering signal; and
   a control device for controlling the pitch angle of the respective blade, wherein the control device is connected to the de-icing triggering device and is adapted, in case of receiving the de-icing triggering signal, to control the respective blade in a manner so as to change the pitch angle of the respective blade to increase the corresponding angle of attack until stalling to thereby allow the correspondingly caused turbulences to induce vibrations in the blade causing ice on the blade to break off,
   wherein each blade is provided with one or more vibration sensors which detect vibration of the blade and which are connected to the control device to supply a corresponding feedback vibration signal to the control device, wherein the control device is adapted to compare the received feedback vibration signal with a pre-defined vibration threshold, and, if the received feedback vibration signal exceeds the vibration threshold, to control the respective blade in a manner so as to re-change the pitch angle of the respective blade to decrease the corresponding angle of attack until the stalling is reduced such as to reduce the induced vibrations in the blade to be kept below the predefined threshold.

10. The wind turbine of claim 9, wherein the de-icing triggering device includes an ice detecting sensor device provided on each of the blades, which can create the de-icing triggering signal.

11. The wind turbine of claim 9, wherein the de-icing triggering device includes a wind-speed detector detecting the ambient wind speed in an area at the wind turbine, a rotational speed detector detecting a rotational speed of the rotor, and a calculation device which is adapted to create the de-icing triggering signal as a function of the detected wind-speed and the detected rotational speed of the wind turbine.

12. The wind turbine according to claim 9, wherein the control device is adapted to simultaneously change the pitch angle of all of the blades to correspondingly increase the angle of attack of all blades at the same time until stalling in case the de-icing triggering signal is received by the control device.

13. The wind turbine according to claim 9, further comprising a sensor for detecting a rotational speed of the rotor, wherein the control device is adapted to control the change of the pitch angle of the respective blade for stalling in dependence from the detected rotational speed of the rotor.

14. The wind turbine according to claim 9, further comprising a manual input device connected to the control device and allowing manual input of the de-icing triggering signal to be forwarded to the control device.

* * * * *